Patented June 26, 1928.

1,674,676

UNITED STATES PATENT OFFICE.

WILHELM HESS, OF BERLIN-GROSS-LICHTERFELDE-WEST, GERMANY, ASSIGNOR TO ALLGEMEINE GESELLSCHAFT FÜR CHEMISCHE INDUSTRIE M. B. H., OF BERLIN-SCHONEBERG, GERMANY, A CORPORATION OF GERMANY.

PROCESS FOR TREATING OILS WITH LIQUID SULPHUR DIOXIDE.

No Drawing. Application filed October 28, 1926, Serial No. 144,906, and in Germany March 29, 1926.

This invention relates to processes of treating oils with liquid sulphur dioxide and it comprises a process in which the oil to be treated is first subjected to the action of a minor quantity of liquid sulphur dioxide for the express purpose of removing water from the oil and thereafter continuing the treatment of the oil with liquid sulphur dioxide in order to improve the oil.

One of the difficulties encountered in carrying out the process for purifying hydrocarbons or other similiar products with liquid sulphur dioxide is to prevent the water present in the material under treatment from exerting a detrimental effect during the carrying out of the process. It is assumed for the present purpose that the measures which have hitherto been used for attaining this object, are known.

I have found as a result of numerous experiments that the detrimental effect of water can be completely obviated by first treating the oil with a minor quantity of liquid sulphur dioxide. The sulphur dioxide layer after the treatment is separated off and it will be found that substantially all of the water in the oil is taken up by the liquid sulphur dioxide. In other words, I use a small portion of liquid sulphur dioxide for the express purpose of drying the oil prior to treatment with sulphur dioxide in the customary way.

If this preliminary extract, which is the term I should prefer to apply to it, is isolated, the liquid sulphur dioxide contained in it can be recovered therefrom by using the apparatus and precautionary measures necessary in the working up of aqueous sulphurous acid. The primary material that is the oil separated from the preliminary extract is further treated in the apparatus in the usual way with the main portion of the sulphur dioxide and, as it contains no more water, the recovery of the sulphurous acid presents none of the known difficulties and consequently results in a simplification and increased reliability of the whole arrangement.

As a specific example, I may treat 100 parts by weight of a California kerosene distillate placed in a closed vessel with 25 parts by volume of liquefied sulphur dioxide. This mixture is stirred until a homogeneous mixture is produced. The mixture is now allowed to settle, stirred up and the bottom layer separated, which contains part of the impurities and all the water contained in the distillate, whereupon the upper layer that is, the treated distillate, is further treated in one or more portions with as much liquefied sulphur dioxide as is necessary for removing all undesirable constituents. As stated, the preliminary sulphur dioxide extract, which extract contains all of the water in the oil, is worked up separately for the recovery of its sulphur dioxide content. The sulphur dioxide extracts subsequently obtained by treating the preliminarily treated oil with further quantities of liquid sulphur dioxide are also worked up separately. The advantage in this is that the first extract, which contains the water, can be considered as a solution of sulphurous acid from which the recovery of sulphur dioxide, is comparatively simple. The subsequently obtained extracts are free of water and the recovery of sulphur dioxide from them is simple. If one treated oil with several portions of sulphur dioxide and thereafter recovered the sulphur dioxide from the various extracts as a whole, that is by uniting the various extracts and thereafter recovering the sulphur dioxide, considerable difficulty would be involved simply because the small amount of water present complicates the recovery.

Having now particularly described and ascertained the nature of my said invention and in what manner the same is to be performed, I declare that what I claim is:—

In the process of treating hydrocarbon oils containing moisture with liquid sulphur dioxide, the steps which comprise treating the oil with a minor quantity of liquid sulphur dioxide in order to remove water from the oil, separating the oil from the sulphur dioxide extract, then treating the oil with the major quantity of liquid sulphur dioxide in order to remove undesirable constituents from the oil and thereafter separately recovering liquid sulphur dioxide from the first aqueous extract thereof and the non-aqueous extract thereof for re-use in the process.

In testimony whereof I have signed my name to this specification.

WILHELM HESS.